Patented May 25, 1948

2,442,083

UNITED STATES PATENT OFFICE 2,442,083

ADHESIVE COMPOSITION

Frederick M. Hall and Richard W. Griffith, Naugatuck, Conn., assignors to United States Rubber Company, New York, N. Y., a corporation of New Jersey No Drawing. Application August 12, 1943, Serial No. 498,400

11 Claims. (Cl. 260—93)

This invention relates to an adhesive composition, more particularly to a self-curing butyl rubber cement for adhering natural rubber and various synthetic rubber-like materials to themselves and to each other, and also to such materials as leather, metal and various synthetic resins, for example, phenolic resins and urea-formaldehyde resins.

Butyl rubber, a synthetic rubber-like material, which is a copolymer of an olefine and a diolefine, for example, a copolymer of a major proportion of isobutylene and a minor proportion of a diolefine copolymerizable therewith, such as, butadiene-1,3, isoprene, 2,3-dimethyl butadiene-1,3, pentadiene-1,3, is referred to in British Patent 523,248, and in Industrial and Engineering Chemistry, 32, pages 1283 et seq. (1940). Butyl rubber is not capable of being made into a satisfactory curing adhesive cement by the methods commonly used with natural rubber. With natural rubber it is only necessary to dissolve the rubber, compounded with the usual vulcanizing ingredients, in a suitable organic solvent medium, apply the cement to the rubber or other parts to be adhered together, and vulcanize the bond to give the desired adhesion. With butyl rubber satisfactory adhesion of natural rubber or synthetic rubber-like materials to themselves or to other materials cannot be obtained in this manner. It has previously been found necessary to cure or vulcanize the butyl rubber in the cement form after dissolution in the organic solvent medium before applying it to the parts to be adhered together.

According to the present invention, we are able to prepare a butyl rubber cement which, after application to the parts to be adhered, is self-curing at ordinary temperatures, or may be cured at elevated temperatures as in a mold or press.

In carrying out the present invention, an organic compound which readily liberates halogen, such as an N-chloro amide, for example, chlorobenzamide

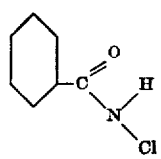

or a chlorinated hydantoin, such as 1,3-dichloro-5,5-dimethyl hydantoin,

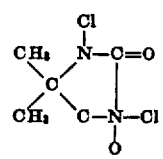

is added to a butyl rubber organic solvent cement containing an organic vulcanizing agent for the butyl rubber, for example a quinone-oximino compound, such as the quinone-oximes, their metal salts, ethers and esters as disclosed in the Fisher U. S. Patent No. 2,170,191. Parabenzoquinone dioxime, which is a commercial vulcanizing agent, is the preferred quinone-oximino compound. The N-chloroamide permits such a cement to be applied without prevulcanization to the parts to be bonded together, and to cure, after application, at room or elevated temperatures to form an excellent adhesive bond between the parts. An organic compound which readily liberates chlorine, such as an N-chloro amide, can be readily added to a solvent solution of the butyl rubber compound containing the parabenzoquinone dioxime, in the form of a solution of the N-chloro amide in an organic solvent compatible or miscible with the solvent for the butyl rubber shortly before application of the cement to the parts to be bonded together, since the addition of the N-chloro amide to the butyl rubber solution causes vulcanization of the butyl rubber which in time will set up or gel the cement. The larger the proportion of the N-chloro amide, the shorter will be the gelling time of the cement. Fillers, such as carbon black, whiting, clays or finely divided hydrated calcium silicate, may be added to the butyl rubber to increase the length of time before the cement will set-up or gel. The butyl rubber may be compounded with zinc oxide and sulphur but this is not necessary for vulcanization of the butyl rubber in the presence of parabenzoquinone dioxime and 1,3-dichloro-5,5-dimethyl hydantoin. The N-chloro amide, such as a 1,3-dichloro-5,5-dialkyl hydantoin, may be added in amounts up to 2 parts by weight per 100 parts of the butyl rubber, and filler material may be readily added up to 100 parts per 100 parts of butyl rubber.

The adhesive composition of the present invention may be used to bond natural rubber or various synthetic rubber-like materials, such as neoprene (polychloroprene), Buna S (copolymer of a major proportion of butadiene-1,3 and a minor proportion of styrene), Buna N (copolymer of a major proportion of butadiene-1,3 and acrylic nitrile), and butyl rubber to themselves and to each other, and also to such materials as leather, metal and various synthetic resins, such as phenolic resins and urea-formaldehyde resins.

The following is given merely as an illustrative example of preparing an adhesive composition according to the present invention: 100 parts of butyl rubber (all parts by weight) were milled for 10 minutes on a cold mill, after which there was added and mixed therein the following:

|  | Parts |
|---|---|
| Finely ground hydrated calcium silicate | 60 |
| Zinc oxide | 5 |
| Sulphur | 1.5 |
| Parabenzoquinone dioxime (commercial vulcanizing agent "GMF" sold by United States Rubber Co.) | 3 |

This compound was dissolved in about 500 parts of a solvent naphtha. Separately, 2 parts of 1,3-dichloro-5,5-dimethyl hydantoin (commercial "Dactin" sold by E. I. du Pont de Nemours & Co.) were dissolved in a mixture of 50 parts of a nitroparaffin solvent (1-nitropropane) and 150 parts of a solvent naphtha. Because of the difficulty in dissolving "Dactin" in a straight hydrocarbon solvent, the chlorinated hydantoin is preferably dissolved with the aid of a nitroparaffin, as in a mixture of a nitro-paraffin and an aliphatic or aromatic hydrocarbon solvent. The adhesive cement was made ready for use by adding the "Dactin" solution to the butyl rubber compound in the organic solvent medium. The cement did not set up or gel before 12 to 24 hours and therefore sufficient time was readily available for applying the cement for whatever bonding purposes were desired. Such a cement after application develops its adhesive strength in the bond at room temperature within up to three days after application. The cement does not develop the desired adhesive characteristics in the absence of the chlorinated hydantoin. Similar results were obtained with the same cement but leaving out the zinc oxide and sulphur. A cement prepared according to the above formulation with chlorobenzamide instead of the 1,3-dichloro-5,5-dimethyl hydantoin gave a satisfactory self-curing adhesive.

Adhesives of the present invention are readily applicable to cement-seaming fabrics coated with rubber or rubber-like materials where it is desired to make a tear-resistant bond at room temperature in the seams of the article, as in the manufacture of barrage balloons and pontoons made of fabrics with a calendered coating of natural rubber, or synthetic rubber-like material, such as neoprene, Buna S, Buna N, or butyl rubber. Similar adhesive compositions may also be used at elevated temperatures as in a press or mold where natural rubber or synthetic rubber-like materials are to be secured to each other or to steel or to synthetic resins, such as phenolic resins and urea-formaldehyde resins. The organic solvent medium for the cement may be an aliphatic hydrocarbon, such as gasolene, or an aromatic hydrocarbon, such as a solvent naphtha.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. An adhesive composition comprising in admixture in organic solvent medium, a copolymer of a major proportion of isobutylene and a minor proportion of a diolefine copolymerizable therewith, a quinone-oximino compound, and N-chlorobenzamide, the last mentioned chemical being present in effective amounts ranging up to about two percent by weight based on said copolymer.

2. An adhesive composition comprising in admixture in organic solvent medium, a copolymer of a major proportion of isobutylene and a minor proportion of a diolefine copolymerizable therewith, a quinone-oximino compound, and 1,3-dichloro-5,5 dimethyl hydantoin, the last mentioned chemical being present in effective amounts ranging up to about two percent by weight based on said copolymer.

3. An adhesive composition capable of self-curing at ordinary temperatures comprising in admixture in organic solvent medium, a copolymer of a major proportion of isobutylene and a minor proportion of a diolefine copolymerizable therewith, a quinone-oximino compound, and an N-chloroamide, the last mentioned chemical being present in effective amounts ranging up to about two percent by weight based on said copolymer.

4. An adhesive composition comprising in admixture in organic solvent medium, a copolymer of a major proportion of isobutylene and a minor proportion of a diolefine copolymerizable therewith, parabenzoquinone dioxime, and N-chlorobenzamide, the last mentioned chemical being present in effective amounts ranging up to about two percent by weight based on said copolymer.

5. An adhesive composition comprising in admixture in organic solvent medium, a copolymer of a major proportion of isobutylene and a minor proportion of a diolefine copolymerizable therewith, parabenzoquinone dioxime, and 1,3-dichloro-5,5-dimethyl hydantoin, the last mentioned chemical being present in effective amounts ranging up to about two percent by weight based on said copolymer.

6. An adhesive composition capable of self-curing at ordinary temperatures comprising in admixture in organic solvent medium, a copolymer of a major proportion of isobutylene and a minor proportion of a diolefine copolymerizable therewith, parabenzoquinone dioxime, and an effective amount ranging up to about 2 parts by weight of an N-chloro amide per 100 parts of said copolymer.

7. A composite article in which a rubbery material is bonded to a surface by means of an intermediate film of the vulcanized product of a self-curing isobutylene-diolefine copolymer rubber composition containing a vulcanizing agent therefor, and an N-chloroamide, the last mentioned chemical being present in effective amounts ranging up to about two percent by weight based on said copolymer, and said copolymer being a copolymer of a major proportion of isobutylene and a minor proportion of a diolefine copolymerizable therewith.

8. A composite article in which a rubbery material is bonded to a surface by means of an intermediate film of the vulcanized product of a self-curing isobutylene-diolefine copolymer rubber composition containing parabenzoquinone dioxime, and an N-chloro amide, the last mentioned chemical being present in effective amounts ranging up to about two percent by weight based on said copolymer, and said copolymer being a copolymer of a major proportion of isobutylene and a minor proportion of a diolefine copolymerizable therewith.

9. A composite article in which a rubbery material is bonded to a surface by means of the vulcanized product of a self-curing isobutylene-diolefine copolymer rubber composition containing parabenzoquinone dioxime, and N-chlorobenzamide, the last mentioned chemical being present in effective amounts ranging up to about two percent by weight based on said copolymer, and said copolymer being a copolymer of a major proportion of isobutylene and a minor proportion of a diolefine copolymerizable therewith.

10. A composite article in which a rubbery material is bonded to a surface by means of the vulcanized product of a self-curing isobutylene-diolefine copolymer rubber composition containing parabenzoquinone dioxime and 1,3-dichloro-5,5-dimethyl hydantoin, the last mentioned chemical being present in effective amounts ranging up to about two percent by weight based on said copolymer, and said copolymer being a copolymer of a major proportion of isobutylene and a minor proportion of a diolefine copolymerizable therewith.

11. The vulcanization product of a mixture capable of self-curing at ordinary temperatures containing a copolymer of a major proportion of isobutylene and a minor proportion of a diolefine copolymerizable therewith, parabenzoquinone dioxime, and an N-chloro amide, the last mentioned chemical being present in effective amounts ranging up to about two percent by weight based on said copolymer.

FREDERICK M. HALL.
RICHARD W. GRIFFITH.

REFERENCES CITED

The following references are of record in the file of this patent:

UNITED STATES PATENTS

| Number | Name | Date |
|---|---|---|
| 2,278,539 | Elliot | Apr. 7, 1942 |
| 2,311,004 | Thomas | Feb. 16, 1943 |

OTHER REFERENCES

Hackh's Chemical Dictionary, 2nd ed., Blakiston, 1937, articles "Amide" and "Imide," pages 47 and 478.

Industrial and Engineering Chemistry, article by Fisher, pages 941–945, vol. 31, No. 8, August, 1939.

---

Certificate of Correction

Patent No. 2,442,083.  May 25, 1948.

FREDERICK M. HALL ET AL.

It is hereby certified that error appears in the printed specification of the above numbered patent requiring correction as follows: Column 2, lines 7 to 9 inclusive, for that portion of the formula reading

and that the said Letters Patent should be read with this correction therein that the same may conform to the record of the case in the Patent Office.

Signed and sealed this 19th day of October, A. D. 1948.

[SEAL]

THOMAS F. MURPHY,
*Assistant Commissioner of Patents.* dioxime, and an N-chloro amide, the last mentioned chemical being present in effective amounts ranging up to about two percent by weight based on said copolymer, and said copolymer being a copolymer of a major proportion of isobutylene and a minor proportion of a diolefine copolymerizable therewith.

9. A composite article in which a rubbery material is bonded to a surface by means of the vulcanized product of a self-curing isobutylene-diolefine copolymer rubber composition containing parabenzoquinone dioxime, and N-chlorobenzamide, the last mentioned chemical being present in effective amounts ranging up to about two percent by weight based on said copolymer, and said copolymer being a copolymer of a major proportion of isobutylene and a minor proportion of a diolefine copolymerizable therewith.

10. A composite article in which a rubbery material is bonded to a surface by means of the vulcanized product of a self-curing isobutylene-diolefine copolymer rubber composition containing parabenzoquinone dioxime and 1,3-dichloro-5,5-dimethyl hydantoin, the last mentioned chemical being present in effective amounts ranging up to about two percent by weight based on said copolymer, and said copolymer being a copolymer of a major proportion of isobutylene and a minor proportion of a diolefine copolymerizable therewith.

11. The vulcanization product of a mixture capable of self-curing at ordinary temperatures containing a copolymer of a major proportion of isobutylene and a minor proportion of a diolefine copolymerizable therewith, parabenzoquinone dioxime, and an N-chloro amide, the last mentioned chemical being present in effective amounts ranging up to about two percent by weight based on said copolymer.

FREDERICK M. HALL.
RICHARD W. GRIFFITH.

REFERENCES CITED

The following references are of record in the file of this patent:

UNITED STATES PATENTS

| Number | Name | Date |
| --- | --- | --- |
| 2,278,539 | Elliot | Apr. 7, 1942 |
| 2,311,004 | Thomas | Feb. 16, 1943 |

OTHER REFERENCES

Hackh's Chemical Dictionary, 2nd ed., Blakiston, 1937, articles "Amide" and "Imide," pages 47 and 478.

Industrial and Engineering Chemistry, article by Fisher, pages 941–945, vol. 31, No. 8, August, 1939.

---

Certificate of Correction

Patent No. 2,442,083.   May 25, 1948.

FREDERICK M. HALL ET AL.

It is hereby certified that error appears in the printed specification of the above numbered patent requiring correction as follows: Column 2, lines 7 to 9 inclusive, for that portion of the formula reading

and that the said Letters Patent should be read with this correction therein that the same may conform to the record of the case in the Patent Office.

Signed and sealed this 19th day of October, A. D. 1948.

[SEAL]

THOMAS F. MURPHY,
*Assistant Commissioner of Patents.*